March 20, 1951  F. S. ELSAESSER  2,545,451
GROUND MEAT PATTY FORMING MACHINE
Filed Jan. 2, 1948  4 Sheets-Sheet 1

INVENTOR.
FRANK S. ELSAESSER
BY Joseph A. Pave
ATTY.

Patented Mar. 20, 1951

2,545,451

UNITED STATES PATENT OFFICE 2,545,451

GROUND MEAT PATTY FORMING MACHINE

Frank S. Elsaesser, Cincinnati, Ohio

Application January 2, 1948, Serial No. 254

16 Claims. (Cl. 17—32)

This invention relates to improvement in a machine for forming ground meat patties such as Hamburg steak patties and country sausage patties.

This machine is an improvment on applicant's pending application Serial No. 741,053 for means and method for forming ground meat patties filed April 12, 1947, and will find its principal use in restaurants and restaurant supplying establishments.

The principal object of the present invention is to provide a compact machine for forming ground meat patties whereby a small amount of space is occupied while accomplishing the desired result.

Another object of the present invention is the provision of a machine for providing Hamburg steak or other ground meat patties in which the said patties are provided on each side thereof with a protecting paper which is supplied from rolls and in which the said paper rolls are utilized as the means for effecting the mashing of the ground meat into patties.

Another object of the present invention is the provision of a machine for accomplishing the foregoing objects which utilizes the paper rolls as the flattening or mashing device and wherein means are provided for insuring said paper rolls so acting as their size and weight decreases.

Another object of this invention is the provision of a machine for accomplishing the foregoing objects and in which the ground meat patties are produced in a continuous stream together with means whereby the said patties covering papers are severed to separate the patties from one another.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings.

Throughout the several views of the drawings similar reference characters are employed to denote the same or similar parts.

The ground meat patty forming machine of the present invention comprises a table 15 suitably supported by legs, or the like, 16. Mounted on the table 15 at one end thereof is a meat grinder forming, per se, no part of the present invention and comprising a pedestal 17 mounted on a pillow block 18 upstanding from the table 15. At the upper end of the pedestal 16 is an electric motor 19 driving through suitable reduction gearing, not shown, within a housing 20 a feed shaft or worm 21. The feed worm 21 is enclosed in the housing 22 which has upstanding a filler neck 23 receiving the discharge spout 24 of a meat supporting tray 25. At the end of the meat grinder housing 22 is disposed the comminute plate 26 acting as a knife in cooperation with a rotating knife 27 at the end of the feed screw 21. Forwardly of the plate 26 is a discharge nozzle 28 having at its inner end a radial flange 29 cooperating with an inwardly projecting radial flange 30 on the nut 31. The nozzle 28, at its outer end, is provided with a flange 32 that, as will later be made clear, cooperates with a cut-off knife.

The foregoing description of a meat grinder is standard practice it being understood that the nut 31 secures the comminuting plate 26 and nozzle 28 in operative position.

Mounted on and upstanding from the table 15 are suitable roll supporting means for the paper masher rolls, there are four such means, one for each side of the rolls, and it is deemed sufficient if but one of them be described in detail.

Accordingly, a bracket 33 is employed being secured in operative position by angle members 34. Secured to and inwardly of the bracket 33 is a supporting cam 35, shown most clearly in elevation in Fig. 7. The cam 35 has a cam face 36 formed substantially as illustrated in Fig. 7, located below the upper edge of the bracket 33 to form an abutment 56, said cam face 36 is formed to cooperate with the paper rolls as the same decrease in size and as will later be made clear.

The paper roll supporting means are opposed to one another with the cam faces 35 of each pair of opposed cams in substantial alignment and receiving the projecting ends of an axle 37 of a paper roll 38. It will be understood that the paper roll 38 is opposed by a substantially similar paper roll 39 having a central shaft or axle 40 projecting from opposite sides thereof and supported on the cams 35 of the second set or pair of supporting means. The ends of the shafts or axles 37 and 40 are adapted to engage the bracket abutments 33' to retain same in operative positions.

Figure 6:
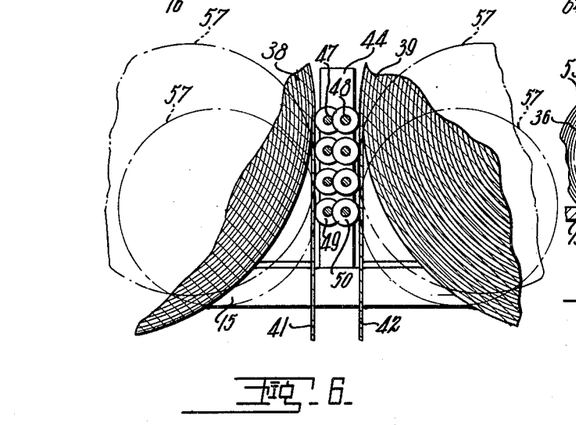
Fig. 6 is an enlarged fragmentary sectional view through the machine throat as seen from line 6—6 on Fig. 3.
Figure 7:
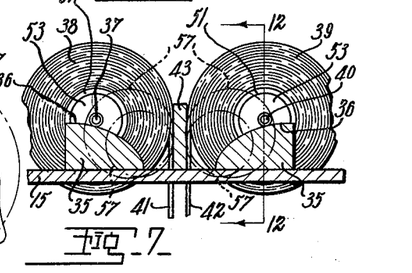
Fig. 7 is a fragmentary sectional view taken on line 7—7 on Fig. 3 and illustrating the several positions of the paper rolls during the formation of the ground meat patties.

The paper rolls 38 and 39 are adapted to form between them a flattening or mashing throat substantially equal to the final thickness of the ground meat patty and respectively have a paper layer 41 and 42 depending from said throat downwardly through an opening 15' in the table 15, as most clearly illustrated in Figs. 6 and 7.

The width of the ground meat patty forming throat is determined by abutments limiting the approach of the paper rolls toward one another and any suitable or desirable means may be employed for this purpose. As illustrated in the drawings, the said abutments comprise a pair of upstanding members or posts 43 and 44 each mounted in position by angle brackets 45. As seen in Fig. 6 each post is provided with a plurality of inwardly projecting axles or studs 47 and 48 arranged in two vertical rows and on which rows of studs are respective rollers 49 and 50. The rollers 49 of the row 47 are adapted to have peripheral engagement with paper roll 38 while the rollers 50 of the row 48 are adapted to have peripheral engagement with the paper roll 39.

Figure 1:
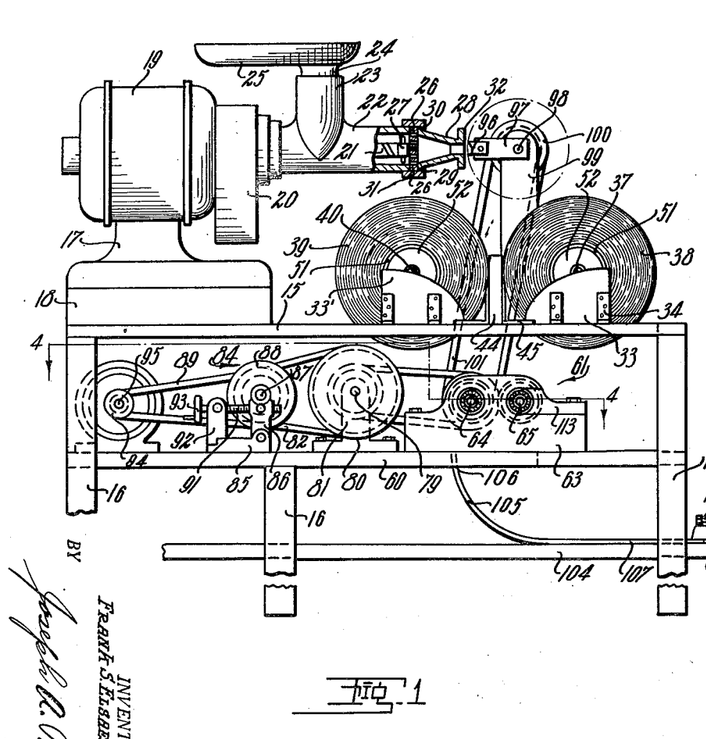
Fig. 1 is a front elevation of a ground meat patty forming machine embodying the principles and structure of the present invention.
Figures 9, 11, 12:
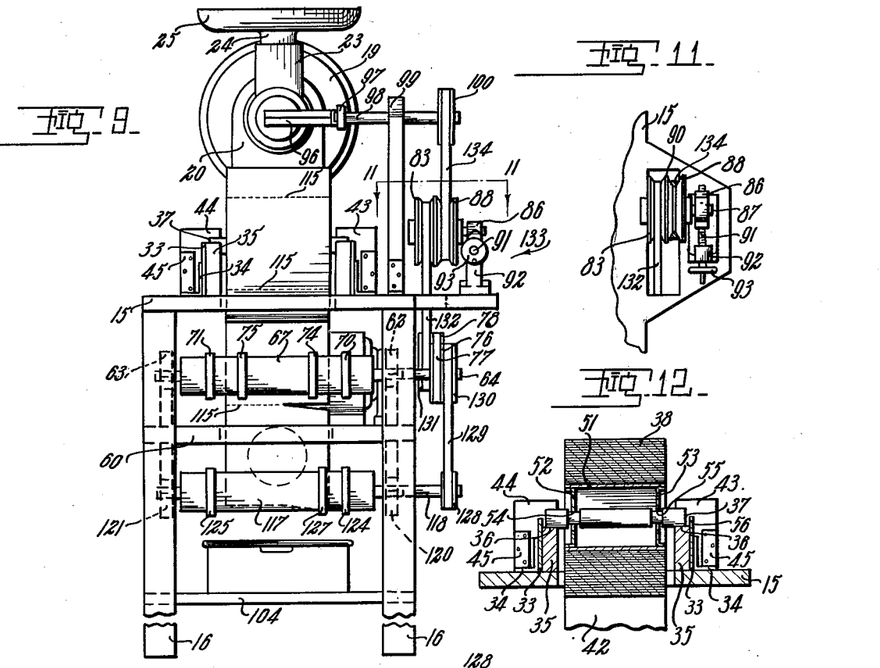
Fig. 9 is a front elevation of the machine of Fig. 8 as seen from the right-hand side thereof.
Fig. 11 is a fragmentary view partly in section and partly in plan as seen from line 11—11 on Fig. 9.
Fig. 12 is a transverse sectional view through one of the paper rolls as seen from line 12—12 on Fig. 7.

As illustrated in the drawings, see Fig. 1 for example, each of the paper rolls 38 and 39 is provided with a center core 51 of considerable dimension inwardly of which projects bearing flanges 52 and 53. The bearing flanges 52 and 53 are also utilized as a means for retaining the paper roll in substantially a centralized position with respect to its axle or shaft 37 and 40 as clearly illustrated in Fig. 12. As there shown the said axle 40 is undercut or necked at 54 and 55 receiving the said bearing flanges 52 and 53. The axles themselves are retained against displacement, as previously pointed out, by engaging the upstanding flange portion 56 or each bracket 33.

It will be understood that the abutment means or rollers 49 and 50 should engage the rolls at points on the central line thereof which passes through the axes of their respective axles or supporting shafts wherefore the plurality of the said abutment rollers 49 and 50. As clearly illustrated in Figs. 6 and 7 by phantom line circles 57, as the paper rolls decrease in size the axles thereof roll downwardly on the cam faces 36 thereby gradually lowering the said axles' axes toward the said table 15 wherefore the rolls engage the abutment rollers successively from the uppermost to the lowermost with the latter so positioned as to retain the paper rolls' cores 51 at the same distance from one another as the full paper rolls as illustrated in Figs. 1 and 7.

It will be appreciated that a full paper roll has considerable weight requiring a considerable pressure to outwardly shift the same wherefore the ground meat is readily mashed or flattened. As the said paper rolls decrease in size their weight correspondingly decreases with the result that they may be more readily and easily shifted. In order to overcome this the cam faces 36 are so formed as to act as wedges resisting outward displacement which is readily seen from Fig. 7 when it is considered that the direct outward push on the paper rolls is substantially directly against the cam faces 36 and not in a direction in line with the direction of the extent of said faces.

Figure 3:
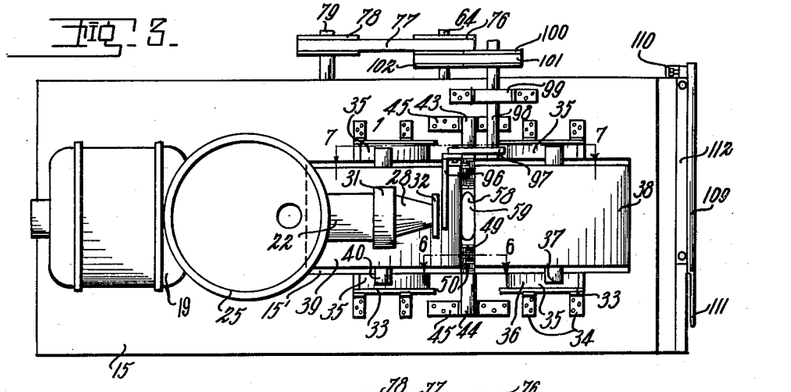
Fig. 3 is a top plan view of the machine of Figs. 1 and 2.

As illustrated in Fig. 3, for example, the abutment rolls 49 and 50 are illustrated as quite narrow and interleaved with respect to one another so that a considerable abutment bearing is provided but the said abutment rolls 49 and 50 are beyond the lateral extent of the patty forming throat 58 as clearly illustrated in Fig. 3 in which the patty is indicated by the reference numeral 59.

Figure 4:
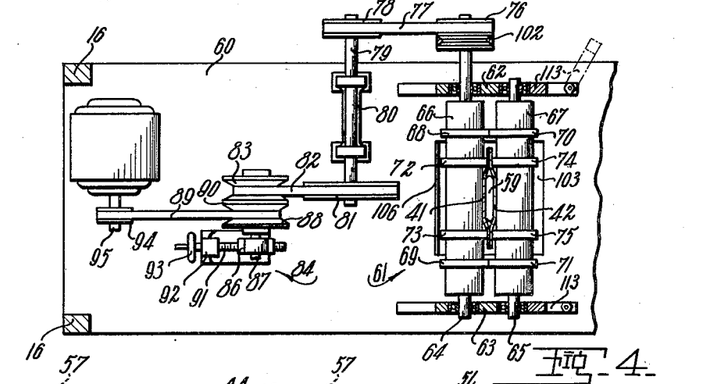
Fig. 4 is a view partly in elevation and partly in section and as seen from line 4—4 on Fig. 1.

Located below the table 15 and supported by the legs 16 is a shelf 60 supporting a feeding device and auxiliary masher indicated in general by the reference numeral 61. The feeding device 61, as seen in Fig. 4, comprises a pair of bearing members 62 and 63 each of which is provided with suitable anti-friction bearings for shafts or axles 64 and 65 of feed rollers 66 and 67. The feed rollers 66 and 67 have their peripheries spaced from one another a distance equal to the final thickness of the patty 59. Said rollers 66 and 67 are suitably connected or geared to one another to rotate in directions whereby the opposed points of their peripheries move downwardly and for which purpose the roller 66 is provided near its outer ends with collars 68 and 69 each in peripheral driving engagement with similar collars 70 and 71 on the roller 67. Intermediate the collars 68 and 69 the roller 66 is provided with additional collars 72 and 73, which like the collars 68 and 69, are opposed to and in peripheral driving engagement with collars 74 and 75 on the roller 67. The collars 72, 73, 74 and 75 are adapted to grip between them the edges of the papers 41 and 42 laterally of the patty 59 and feed or unroll the paper from the paper rolls 38 and 39.

In order to effect this feed of the paper 41 and 42, the shaft or axle 64 projects beyond its bearing 62 to have keyed or otherwise secured thereto a pulley 76 about which is trained a belt 77. The belt 77 is in turn trained about a pulley 78 on one end of an intermediate shaft 79 rotatably journaled in a bracket 80 secured to and upstanding from the shelf 60. The other end of the shaft 79 has keyed or otherwise secured to it a pulley 81 having trained thereabout a belt 82, in turn, trained about a pulley 83 of a variable or adjustable speed mechanism indicated in general by the reference numeral 84. Any suitable or desirable speed varying or adjusting mechanism may be employed that illustrates in the drawing being a commercial product suitable for this purpose and is disclosed merely as an illustration of one type of such mechanism.

The speed adjusting mechanism 84, see also Fig. 1, comprises a bracket 85 that may be secured to the shelf 60 having oscillatably journaled thereon an arm 86 rotatably supporting at its upper end a shaft 87 on which is mounted the pulley 83. Also mounted on the shaft 87 is a second pulley 88 about which is trained a belt 89. The pulleys 83 and 88 have a common side in the form of a pulley flange 90 which is adapted to move axially of the shaft 87 and thereby increase or decrease the effective size of the pulley 83 and correspondingly but oppositely change the effective size of the pulley 88. In order to accomplish this the arm 86 is oscillated through an adjusting screw 91 having a threaded engagement with the arm 86 and rotatably mounted against axial movement in a lug 92 upstanding from the base 85. Carried by the adjusting screw 91 beyond lug 92 is a hand wheel 93 whereby the screw 91 is rotated.

The construction and operation of the speed adjusting mechanism 84 is well known.

The belt 89 in addition is trained about pulley 94 on the motor shaft 95 whereby the transmission train receives its power.

In order to divide the stream of meat being ejected from the nozzle 28 use is made of a knife 96 secured to, see Fig. 3, an arm 97 carried by and projecting from a shaft 98 mounted for rotation in a bearing 99 secured to and upstanding from the table 15. The knife shaft 98 projects beyond the bearing 99 to have keyed or otherwise secured thereto a pulley 100 about which is trained a belt 101 in turn trained about a pulley 102 secured to the feed roller shaft 64.

The operation of the patty forming machine is as follows:

Ground meat is extruded from the nozzle 28 in a continuous stream as is usual practice. Full paper rolls 38 and 39 are mounted in the position shown in Fig. 1 with the paper 41 and 42 extending from their respective rolls downwardly to the feed rolls 66 and 67 and has their longitudinal edges gripped between feeding collars 72 to 75 inclusive. Rotation of the motor shaft 95 causes the feed rolls 66 and 67 to unroll the paper 41 and 42 from their respective rolls and at the same time the knife 96 is actuated for severing successive portions of ground meat from the stream at intervals determined by a complete rotation of the knife shaft 98.

It should be noted that the speed adjusting mechanism 84 is adjusted to the point that each portion of meat, as severed from the stream by the knife 96, is such that it will form a ground meat patty sufficient to provide, for example, a Hamburg steak. It will be understood that by increasing the rate of rotation of the cut-off knife 96 the less meat per patty wherefor the individual user may adjust his machine depending upon the particular size of patty to be served or the particular purpose of the patty.

The severed portions of the ground meat are caught by the paper rolls 38 and 39 and as the paper 41 and 42 thereof is drawn downwardly the said ground meat portions move therewith into and through the throat of said paper rolls. Since the paper rolls are caused to rotate by the unwinding of their paper, the ground meat portions are similarly actuated in being flattened. The paper 41 and 42 along with the patties between are further mashed or flattened, if necessary, by meat peripheries of the feed rolls 66 and 67. It will be seen that the patties along with the papers 41 and 42 pass in a continuous unbroken stream through the throat of the opposed paper rolls.

Figure 2:
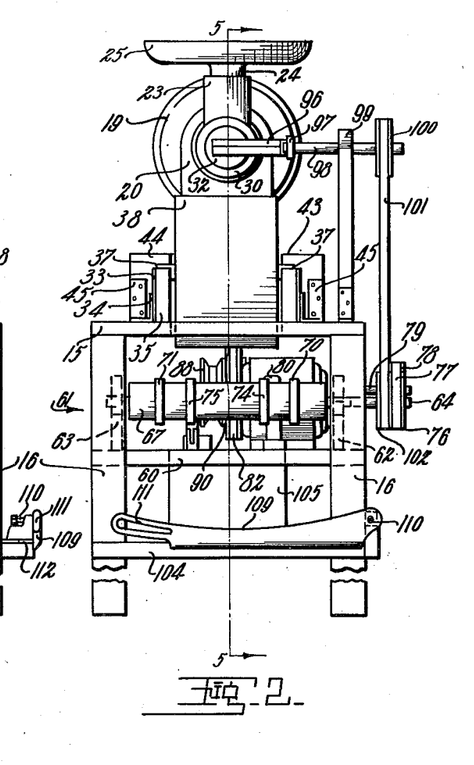
Fig. 2 is a side elevation of the machine in Fig. 1 as seen from the right-hand side thereof.
Figures 5, 8:
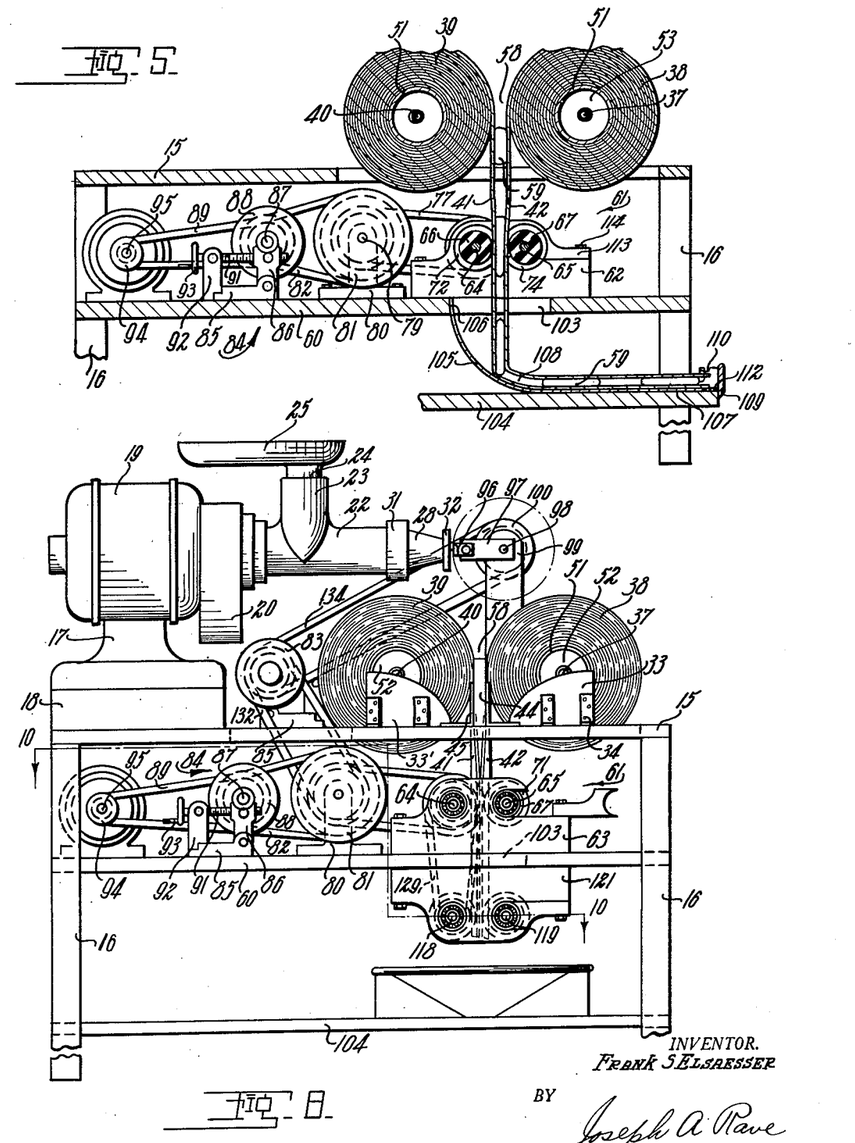
Fig. 5 is a vertical center sectional view through the machine as seen from line 5—5 on Fig. 2 with certain elements omitted.
Fig. 8 is a front elevation, similar to Fig. 1, of a ground meat patty forming machine showing a modification therein.

The stream of patties between the papers pass through the feeding rolls 66 and 67 through an aperture or opening 103 in the shelf 60 to a second shelf 104 located beneath the first shelf 60. To assist in directing the said stream of meat patties and paper a deflector plate 105 is provided having its upper end 106 secured to one edge of the opening 103 and its lower end 107 on the shelf 104. The patties are provided between them with a space 108 through which any suitable or desirable means may be passed for severing the patties from one another and one form of which severing means is clearly disclosed in Figs. 2, 3 and 5.

The said severing means comprises a knife blade 109 having its rear end pivotly mounted at 110 to the corner of the shelf 104 with said knife blade having a handle 111 at its forward end through which it is oscillated relative to a fixed blade 112 carried by the shelf 104 at the forward edge thereof.

It will be understood that the ground meat patties 59 may be individually severed from the stream or said patties may be severed in groups of two or more.

In order to insure the papers 41 and 42 properly passing through the throat 58 and to permit of lateral adjustment thereof and insure said papers bearing a proper relation to one another means are provided whereby the feed rolls 66 and 67 may be released for this purpose. The releasing means consists in forming the bearings retention members for one of the rolls, roll 67, for example, as a swingable latch 113 pivotally mounted in operative position by a bolt 114. By this construction the latch 113 of each bearing assembly 62 and 63 may be swung from the solid line position to the dotted line position as illustrated in Fig. 4.

In the modification illustrated in Figs. 8 to 11, inclusive, use is made of an automatic cut-off or severing mechanism which however required the use of perforated papers 41 and 42. Accordingly, the paper rolls 38 and 39 are each provided with a plurality of transverse perforations 115 thereby, in effect, providing the rolls with individual sheets connected with one another by a line of perforations 115. The use of rolled perforated paper in no wise changes the operation of the machine as above described but enables the use of an automatic cut-off device.

The automatic cut-off device comprises a second pair of rollers 116 and 117 which are quite similar to the feed rollers 66 and 67 with each of said rollers 116 and 117 respectively having a shaft or axle 118 and 119 journaled in suitable bearings 120 and 121 secured to and depending from the underside of the shelf 60. Said bearings are positioned substantially immediately below bearings 62 and 63 one on each side of the opening 103 in the shelf 60. The cut-off rolls 116 and 117 are adapted to rotate in opposite directions at the same speeds for which purpose the roller 116 is provided with a pair of collars 122 and 123 opposed to and in peripheral engagement with collars 124 and 125 on the roller 117. Mounted on each of the rollers 116 and 117 is a third collar 126 and 127 which are in opposition to one another to effect a gripping on the papers 41 and 42. The said gripping collars 126 and 127 are adapted to grip one edge of the papers 41 and 42 outwardly of the patties 59 therebetween and are preferably located immediately below one or the other pair of feed collars 72—74 or 73—75 so as to engage the same edge of the papers 41 and 42.

The rollers 116 and 117 are to be power driven for which purpose one of the shafts or axles thereof, 118 for example, is extended to have keyed or otherwise secured to it a pulley 128 about which is trained a belt 129. The belt 129 extends about a second pulley 130 on the feed roll shaft 64 and which pulley 130 takes the place of the pulley 102 on the shaft 64 for a reason subsequently to be made clear. It is desired that the cut-off rollers 116 and 117 be actuated at speeds in excess of the speed of the feed rollers 66 and 67 wherefor the pulley 128 is of a diameter smaller than the diameter of the pulley 130 on the feed roller shaft 64.

The cut-off rollers 116 and 117 are located below the feed rollers 66 and 67 a distance slightly greater than the distance between successive perforations 115 in the papers 41 and 42 so that a sheet of paper, as determined by successive lines of perforations 115, is below the feed rollers 66 and 67 before being engaged by the cut-off rollers 116 and 117. It has been found that with this construction the paper sheet below the feed rollers upon engagement by the higher speed cut-off rollers 116 and 117 will be torn from the sheet presently engaged by the feed rollers. This is particularly true if but a single pair of collars 126 and 127 is employed which exerts its pulling action at one end of the line of perforations and thereby tears across the sheets in effecting the separation of successive sheets from the rolls, all as is clearly illustrated in Fig. 9.

From the foregoing it will be noted that the ground meat patties are individually severed from the stream with each patty having a covering or protecting sheet of paper from the roll papers 41 and 42.

Figure 10:
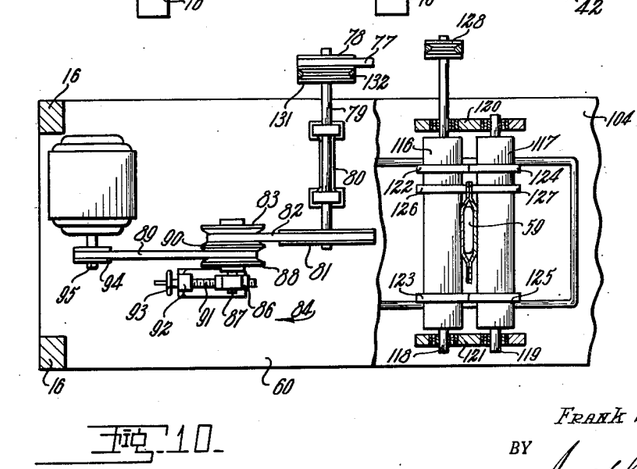
Fig. 10 is a fragmentary view partly in section and partly in plan as seen from line 10—10 on Fig. 8.

With the use of perforated paper it is necessary that the portions of meat cut from the stream being extruded by the grinder fall substantially mid-way between successive lines of perforations 115 in the paper. In order to accomplish this the cut-off knife must be timed in relation to the rotation of the feed rollers since a difference in rotation of the cut-off knife and feed rollers will result in either a creeping up of the lines of perforation 115 on successive meat patties or a lagging behind thereof and for which reason there is provided an additional speed adjusting mechanism in the power train. As seen in Fig. 10 the intermediate shaft 79 is provided with a second pulley 131 about which is trained a belt 132 which extends about a speed adjusting mechanism indicated in its entirety by the reference numeral 133 and which is substantially identical in construction and operation with the speed adjusting mechanism 84 and for a description of which please see above. The speed adjusting mechanism 133 is mounted on and upwardly extends from the table 15. A second belt 134 from the speed adjusting mechanism 133 is trained about the pulley 106 on the knife shaft 98.

From the foregoing it is believed now evident that there has been provided a ground meat patty forming machine that will accomplish the objects initially set forth.

What is claimed is:

1. In a ground meat patty forming machine the combination of a pair of rolls of paper each roll formed from a continuous strip of paper, means operatively mounting said paper rolls to have their peripheries opposed to one another in spaced relation to form between their said opposed peripheries a mashing or flattening throat into which a quantity of ground meat, sufficient to form a patty, is placed, and means operatively connected with said paper rolls for simultaneously rotating the paper rolls and unwinding the paper strips to cause the ground meat quantity to move with the paper strips and pass through the throat and be mashed or flattened into a patty with a protecting paper strip on each side of the patty.

2. In a ground meat patty forming machine the combination of a pair of rolls of paper each roll formed from a continuous strip of paper, means operatively mounting said paper rolls to have their peripheries opposed to one another in spaced relation to form between their said opposed peripheries a mashing or flattening throat into which a quantity of ground meat, sufficient to form a patty, is placed, means operatively connected with said paper rolls for simultaneously rotating the paper rolls and unwinding the paper strips to cause the ground meat quantity to move with the paper strips and pass through the throat and be mashed or flattened into a patty with a protecting paper strip on each side of the patty, and means beyond the mashing or flattening throat for separating the paper strips from the rolls behind the ground meat patty.

3. In a ground meat patty forming machine the combination of a pair of rolls of paper each roll formed from a continuous strip of paper, means operatively mounting said paper rolls to have their peripheries opposed to one another in spaced relation to form between their said opposed peripheries a mashing or flattening throat into which a quantity of ground meat, sufficient to form a patty, is placed, and means operatively connected with said paper rolls for simultaneously rotating the paper rolls and unwinding the paper strips to cause the ground meat quantity to move with the paper strips and pass through the throat and be mashed or flattened into a patty with a protecting paper strip on each side of the patty comprising a pair of feed rolls beyond the mashing or flattening throat for gripping the edges of the paper rolls' strips.

4. In a ground meat patty forming machine the combination of a pair of rolls of paper each roll formed from a continuous strip of paper, means operatively mounting said paper rolls to have their peripheries opposed to one another in spaced relation to form between their said opposed peripheries a mashing or flattening throat into which a quantity of ground meat, sufficient to form a patty, is placed, means operatively connected with said paper rolls for simultaneously rotating the paper rolls and unwinding the paper strips to cause the ground meat quantity to move with the paper straps and pass through the throat and be mashed or flattened into a patty with a protecting paper strip on each side of the patty comprising a pair of feed rolls beyond the mashing or flattening throat for gripping the edges of the paper rolls' strips, and means beyond the feed rolls for separating the paper strips behind a ground meat patty.

5. In a ground meat patty forming machine the combination of a pair of rolls of paper each roll formed from a continuous strip of paper, said strips being laterally weakened, at regular intervals, throughout their length to form in effect a series of paper sheets joined to one another, means operatively mounting said paper rolls to have their peripheries opposed to one another in spaced relation to form between their said opposed peripheries a mashing or flattening throat into which a quantity of ground meat, sufficient to form the patty, is placed, means operatively connected with said paper rolls for simultaneously rotating the paper rolls and unwinding the paper strips to cause the ground meat quantity to move with the paper strips and pass through the throat and be mashed or flattened into a patty with a protecting paper on each side of the patty, and means beyond the mashing or flattening throat for separating the sheets from their paper rolls after passing through the mashing or flattening throat with a ground meat patty between them.

6. In a ground meat patty forming machine the combination of a pair of rolls of paper each roll formed from a continuous strip of paper, said strips being laterally weakened, at regular intervals, throughout their length to form in effect a series of paper sheets joined to one another, means operatively mounting said paper rolls to have their peripheries opposed to one another in spaced relation to form between their said opposed peripheries a mashing or flattening throat into which a quantity of ground meat, sufficient to form the patty, is placed, means operatively connected with said paper rolls for simultaneously rotating the paper rolls and unwinding the paper strips to cause the ground meat quantity to move with the paper strips and pass through the throat and be mashed or flattened into a patty with a protecting paper on each side of the patty, and means beyond the mashing or flattening throat for separating the sheets from their paper rolls after passing through the mashing or flattening throat with a ground meat patty between them, said paper rolls' rotating means comprising a pair of feed rolls beyond the sheet separating means for gripping the edges of the paper rolls' strips simultaneously at each side of said sheets.

7. In a ground meat patty forming machine the combination of a pair of rolls of paper each roll formed from a continuous strip of paper, said strips being laterally weakened, at regular intervals, throughout their length to form in effect a series of paper sheets joined to one another, means operatively mounting said paper rolls to have their peripheries opposed to one another in spaced relation to form between their said opposed peripheries a mashing or flattening throat into which a quantity of ground meat, sufficient to form the patty, is placed, means operatively connected with said paper rolls for simultaneously rotating the paper rolls and unwinding the paper strips to cause the ground meat quantity to move with the paper strips and pass through the throat and be mashed or flattened into a patty with a protecting paper on each side of the patty, and means beyond the mashing or flattening throat for separating the sheets from their paper rolls after passing through the mashing or flattening thoat with a ground meat patty between them, said paper rolls' rotating means comprising a pair of driven feed rolls beyond the sheet separating means for gripping the edges of the paper rolls' strips simultaneously at each side of said sheets, and said sheets separating means comprising a pair of driven rolls rotating at a speed in excess of the speed of the feed rolls for engaging one edge of the paper rolls' strips for separating the sheets at the transverse weakened lines of said strips.

8. In a ground meat patty forming machine the combination of a pair of paper rolls each roll formed from a continuous strip of paper, means operatively mounting said paper rolls to have their peripheries opposed to one another in spaced relation to form between their said opposed peripheries a mashing or flattening throat into which a quantity of ground meat, sufficient to form a patty, is placed, said paper rolls mounting means comprising a supporting axle or shaft for each paper rolls, a cam for each end of each shaft or axle peripherally supporting the same, means operatively connected with said paper rolls for simultaneously rotating the paper rolls and unwinding the paper strips to cause the ground meat quantity to move with said paper strips and pass through the throat to be mashed or flattened into a patty with a protecting paper on each side of the patty, and said cams having a downwardly directed supporting surface to cause said rolls to move toward one another as their size is being diminished for maintaining the peripheries of the paper rolls in their spaced positions.

9. In a ground meat patty forming machine the combination of a pair of paper rolls each roll formed from a continuous strip of paper, means operatively mounting said paper rolls to have their peripheries opposed to one another in spaced relation to form between their said opposed peripheries a mashing or flattening throat into which a quantity of ground meat, sufficient to form a patty, is placed, said paper rolls mounting means comprising a supporting axle or shaft for each paper roll, a cam for each end of each shaft or axle peripherally supporting the same, means operatively connected with said paper rolls for simultaneously rotating the paper rolls and unwinding the paper strips to cause the ground meat quantity to move with said paper strips and pass through the throat to be mashed or flattened into a patty with a protecting paper on each side of the patty, said cams having a downwardly directed supporting surface to cause said rolls to move toward one another as their size is being diminished for maintaining the peripheries of the paper rolls in their spaced positions, and means for limiting the approach of the paper rolls to one another as they descend their supporting cams for maintaining the size of the flattening or mashing throat.

10. In a ground meat patty forming machine the combination of a pair of paper rolls each roll formed from a continuous strip of paper, means operatively mounting said paper rolls to have their peripheries opposed to one another in spaced relation to form between their said opposed peripheries a mashing or flattening throat into which a quantity of ground meat, sufficient to form a patty, is placed, said paper rolls mounting means comprising a supporting axle or shaft for each paper roll, a cam for each end of each shaft or axle peripherally supporting the same, means operatively connected with said paper rolls for simultaneously rotating the paper rolls and unwinding the paper strips to cause the ground meat quantity to move with said paper strips and pass through the throat to be mashed or flattened into a patty with a protecting paper on each side of the patty, said cams having a downwardly directed supporting surface to cause said rolls to move toward one another as their size is being diminished for maintaining the peripheries of the paper rolls in their spaced positions, and means for limiting the approach of the paper rolls to one another as they descend their supporting cams for maintaining the size of the flattening or mashing throat, comprising an upright adjacent to but outwardly of each end of the mashing or flattening throat, and an abutment roller carried by each upright for engagement with the paper rolls along the outer edges thereof at the ends of the mashing or flattening throat.

11. In a ground meat patty forming machine the combination of a pair of paper rolls each roll formed from a continuous strip of paper, means operatively mounting said paper rolls to have their peripheries opposed to one another in spaced relation to form between their said opposed peripheries a mashing or flattening throat into which a quantity of ground meat, sufficient to form a patty, is placed, said paper rolls mounting means comprising a supporting axle or shaft for each paper roll, a cam for each end of each shaft or axle peripherally supporting the same, means operatively connected with said paper rolls for simultaneously rotating the paper rolls and unwinding the strips to cause the ground meat quantity to move with said paper strips and pass through the throat to be mashed or flattened into a patty with a protecting paper on each side of the patty, said cams having a downwardly directed supporting surface to cause said rolls to move toward one another as their size is being diminished for maintaining the peripheries of the paper rolls in their spaced positions, means for limiting the approach of the paper rolls to one another as they descend their supporting cams for maintaining the size of the flattening or mashing throat, said paper rolls rotating and unwinding means comprising a pair of supplemental mashing or flattening rolls beyond the flattening or mashing throat for gripping the edges of the paper strips, and power actuated means for driving said last named rolls.

12. In a ground meat patty forming machine the combination of a pair of rolls of paper each roll formed from a continuous strip of paper, means operatively mounting said paper rolls to have their peripheries opposed to one another in spaced relation to form between their said opposed peripheries a mashing or flattening throat into which a quantity of ground meat, sufficient to form a patty, is placed, means operatively connected with said paper rolls for simultaneously rotating the paper rolls and unwinding the paper strips to cause the ground meat quantity to move with the paper strips and pass through the throat and be mashed or flattened into a patty with a protecting paper strip on each side of the patty, and means beyond the mashing or flattening throat for separating the paper strips from the rolls behind a ground meat patty, comprising a shelf receiving the paper strips with the patty therebetween, and a knife oscillatable relative to the shelf through the paper strips behind the patty.

13. In a ground meat patty forming machine receiving a continuous stream of comminuted meat from a meat grinder the combination of a pair of paper rolls each roll formed of a continuous strip of paper, means operatively mounting said paper rolls to have their peripheries opposed to one another in spaced relation to form a flattening or mashing throat therebetween, means for dividing the stream of comminuted meat into portions each sufficient to form a patty, said divided portions of comminuted meat being placed in the flattening or mashing throat in succession, and means operatively connected with said paper rolls for simultaneously rotating the paper rolls and unwinding the paper strips to cause the comminuted meat portions to move with the paper strips and pass successively through the throat to be mashed or flattened into a patty with a protecting paper on each side of the patties.

14. In a ground meat patty forming machine receiving a continuous stream of comminuted meat from a meat grinder the combination of a pair of paper rolls each roll formed of a continuous strip of paper, said strips being each laterally perforated, at regular intervals, throughout their length to form in effect a series of sheets joined to one another, means operatively mounting said paper rolls to have their peripheries opposed to one another in spaced relation to form between their said opposed peripheries a mashing or flattening throat, means for dividing the stream of comminuted meat into portions each sufficient to form a patty and depositing such comminuted meat portions in succession in the mashing or flattening throat, means operatively connected with said paper rolls for simultaneously rotating the paper rolls and unwinding the paper strips to cause the comminuted meat portions to move with the paper strips and pass through the throat and be mashed or flattened with a protecting paper on each side of the patties, power means for actuating the comminuted meat stream dividing means and for actuating the paper rolls rotating and strip feeding means, and means associated with said power means whereby the said comminuted meat dividing means and paper rolls rotating and strip feeding means are actuated in timed relation to insure a divided portion of ground meat being substantially centrally of the strips' sheets when passing through the flattening and mashing throat.

15. In a ground meat patty forming machine receiving a continuous stream of comminuted meat from a meat grinder the combination of a pair of paper rolls each roll formed of a continuous strip of paper, said strips being each laterally perforated, at regular intervals, throughout their length to form in effect a series of sheets joined to one another, means operatively mounting said paper rolls to have their peripheries opposed to one another in spaced relation to form between their said opposed peripheries a mashing or flattening throat, means for dividing the stream of comminuted meat into portions each sufficient to form a patty and depositing such comminuted meat portions in succession in the mashing or flattening throat, means operatively connected with said paper rolls for simultaneously rotating the paper rolls and unwinding the paper strips to cause the comminuted meat portions to move with the paper strips and pass through the throat and be mashed or flattened with a protecting paper on each side of the patties, power means for actuating the comminuted meat stream dividing means and for actuating the paper rolls rotating and strip feeding means, means associated with said power means whereby the said comminuted meat dividing means and paper rolls rotating and strip feeding means are actuated in timed relation to insure a divided portion of ground meat being substantially centrally of the strips' sheets when passing through the flattening and mashing throat, and means beyond the mashing or flattening throat for separating the sheets from their paper rolls after passing through the mashing throat with a patty between them.

16. In a ground meat patty forming machine receiving a continuous stream of comminuted meat from a meat grinder the combination of a pair of paper rolls each roll formed of a continuous strip of paper, means operatively mounting said paper rolls to have their peripheries opposed to one another in spaced relation to form a flattening or mashing throat therebetween, means for dividing the stream of comminuted meat into portions each sufficient to form a patty, said divided portions of comminuted meat being placed in the flattening or mashing throat in succession, means operatively connected with said paper rolls for simultaneously rotating the paper rolls and unwinding the paper strips to cause the comminuted meat portions to move with the paper strips and pass successively through the throat to be mashed or flattened into a patty with a protecting paper on each side of the patties, and means beyond the mashing or flattening throat for severing the paper strips behind the patties.

FRANK S. ELSAESSER.

REFERENCES CITED

The following references are of record in the file of this patent:

UNITED STATES PATENTS

| Number | Name | Date |
| --- | --- | --- |
| 1,963,718 | Schatz | June 19, 1934 |
| 2,191,497 | Potdevin et al. | Feb. 27, 1940 |
| 2,246,228 | Winter | June 17, 1941 |
| 2,299,314 | Elesh et al. | Oct. 20, 1942 |
| 2,311,843 | Lee | Feb. 23, 1943 |

FOREIGN PATENTS

| Number | Country | Date |
| --- | --- | --- |
| 218,836 | Germany | Feb. 11, 1910 |